(12) United States Patent
Fox

(10) Patent No.: US 8,550,487 B2
(45) Date of Patent: Oct. 8, 2013

(54) TRAILER HITCH BALL COVER

(76) Inventor: Otis Dale Fox, Oxford, MS (US)

( * ) Notice: Subject to any disclaimer, the term of this patent is extended or adjusted under 35 U.S.C. 154(b) by 182 days.

(21) Appl. No.: 13/030,442

(22) Filed: Feb. 18, 2011

(65) Prior Publication Data

US 2011/0204595 A1  Aug. 25, 2011

Related U.S. Application Data

(60) Provisional application No. 61/306,497, filed on Feb. 21, 2010.

(51) Int. Cl.
*B60D 1/60* (2006.01)

(52) U.S. Cl.
USPC .............................. 280/507; 439/35

(58) Field of Classification Search
USPC ............... 280/507, 422, 504; 439/35, 36; 150/155; 296/136
See application file for complete search history.

(56) References Cited

U.S. PATENT DOCUMENTS

| | | |
|---|---|---|
| D234,549 S | 3/1975 | Bell |
| D242,399 S | 11/1976 | Cox |
| 4,370,758 A | 2/1983 | Mattheis |
| 4,861,062 A * | 8/1989 | Stidsen .................... 280/507 |
| D317,890 S | 7/1991 | Bachmann |
| D336,880 S * | 6/1993 | Drummond .................. D12/162 |
| D344,257 S | 2/1994 | Eppard |
| D358,794 S | 5/1995 | Thigpen |
| D359,018 S | 6/1995 | Thigpen |
| D364,264 S | 11/1995 | Sheer |
| D370,836 S | 6/1996 | Van Blankenburg |
| D392,926 S | 3/1998 | Adelaar |
| D399,802 S | 10/1998 | Adelaar |
| D401,193 S | 11/1998 | Julian |
| D402,599 S | 12/1998 | Adelaar |
| D409,537 S | 5/1999 | Adelaar |
| D413,291 S | 8/1999 | Corns, Jr. |
| D415,080 S | 10/1999 | Schultz |
| D428,839 S | 8/2000 | Horowitz |
| D429,668 S | 8/2000 | Julian |
| 6,102,424 A * | 8/2000 | Cole et al. .................. 280/507 |
| D430,520 S | 9/2000 | Benoun |
| D433,358 S | 11/2000 | McBroom |
| D444,111 S | 6/2001 | Gross |
| D456,321 S | 4/2002 | Sammons et al. |
| D462,303 S | 9/2002 | Swiggart |
| D475,328 S | 6/2003 | Murguia |
| D493,751 S | 8/2004 | Brabant, Sr. et al. |
| D519,424 S | 4/2006 | Fisher |
| D526,603 S | 8/2006 | Gates, II |

(Continued)

*Primary Examiner* — Tony Winner
*Assistant Examiner* — Jacob Knutson
(74) *Attorney, Agent, or Firm* — Kilpatrick Townsend & Stockton LLP

(57) ABSTRACT

Certain embodiments of the present invention include a trailer hitch ball cover comprising an outer shell, an inner socket positioned within the outer shell, and a channel positioned adjacent a lower end of the inner socket, which substantially conforms to a trailer hitch ball and a trailer hitch ball neck. The outer shell may also comprise a first and second component that, when adjacent, form the inner socket and channel. The second component may be pivotally and/or releasably coupled to the first component. The outer shell may also be shaped to resemble human headgear, including a football helmet with facemask, chin strap, and face. Light sources may be positioned on an upper surface and a lower surface of the football helmet and a lower surface of the facemask for illumination.

10 Claims, 9 Drawing Sheets

(56) References Cited

U.S. PATENT DOCUMENTS

D558,101 S    12/2007  Dringenberg
D574,759 S    8/2008   Thigpen
D574,760 S    8/2008   Thigpen
D575,685 S    8/2008   Thigpen

* cited by examiner

TRAILER HITCH BALL COVER

CROSS REFERENCE TO RELATED APPLICATIONS

This application is related to and claims priority benefits from U.S. Provisional Application Ser. No. 61/306,497, filed on Feb. 21, 2010, entitled SPORTS HELMET ENTERPRIZE. The '497 application is hereby incorporated in its entirety by this reference.

FIELD OF THE INVENTION

The field of the invention relates to trailer hitch balls and their utility beyond connecting vehicles to trailer hitches. More specifically, it pertains to covers for such trailer hitch balls.

BACKGROUND

Many motor vehicles, such as trucks, sport-utility vehicles and campers, are equipped with trailer hitch balls. These hitch balls are used primarily for trailer hitch purposes, like towing and pulling. Additionally, however, vehicle owners also utilize trailer hitch balls for decorative purposes, such as displaying the owners' loyalties to sports teams for example. No matter the use, however, these hitch balls are subject to rust and deterioration if not protected from the weather and other damaging factors while traveling.

Given the numerous utilization options for trailer hitch balls, it is advantageous for a vehicle owner to be able to quickly cover and uncover the trailer hitch ball as desired. Most conventional trailer ball hitch covers, however, require devotion of time and tools to remove and attach the covers. These attachment means can also detract from the appearance of the trailer hitch ball cover.

Additionally, given that vehicle owners commonly utilize trailer hitch ball covers for decorative purposes, it is advantageous for the cover and its design to be well-illuminated at all times.

SUMMARY

Certain embodiments of the present invention include a trailer hitch ball cover comprising an outer shell, an inner socket positioned within the outer shell, and a channel positioned adjacent a lower end of the inner socket, which substantially conforms to a trailer hitch ball and trailer hitch ball neck. In some embodiments, the inner socket may comprise a recess formed with a cushion positioned on an interior surface of the outer shell. In other embodiments, the inner socket may comprise a receptacle coupled to the recess formed within the cushion. This receptacle may comprise a spherical claw with a plurality of prongs.

In other embodiments, the outer shell comprises a first and second component that, when adjacent, form the inner socket and channel. The second component is pivotally coupled to the first component and releasably coupled to the first component through various methods throughout the embodiments, including engaging a button positioned on the first component with an aperture positioned on the second component in one embodiment.

In some embodiments, the outer shell is shaped to resemble human headgear, including a football helmet with facemask, chin strap, and face. Additionally, in other embodiments, light sources may be positioned on the trailer hitch ball cover to illuminate the trailer hitch ball cover. In some embodiments, light sources may be positioned on an upper surface and a lower surface of the football helmet and a lower surface of the facemask.

DETAILED DESCRIPTION

Figure 1:
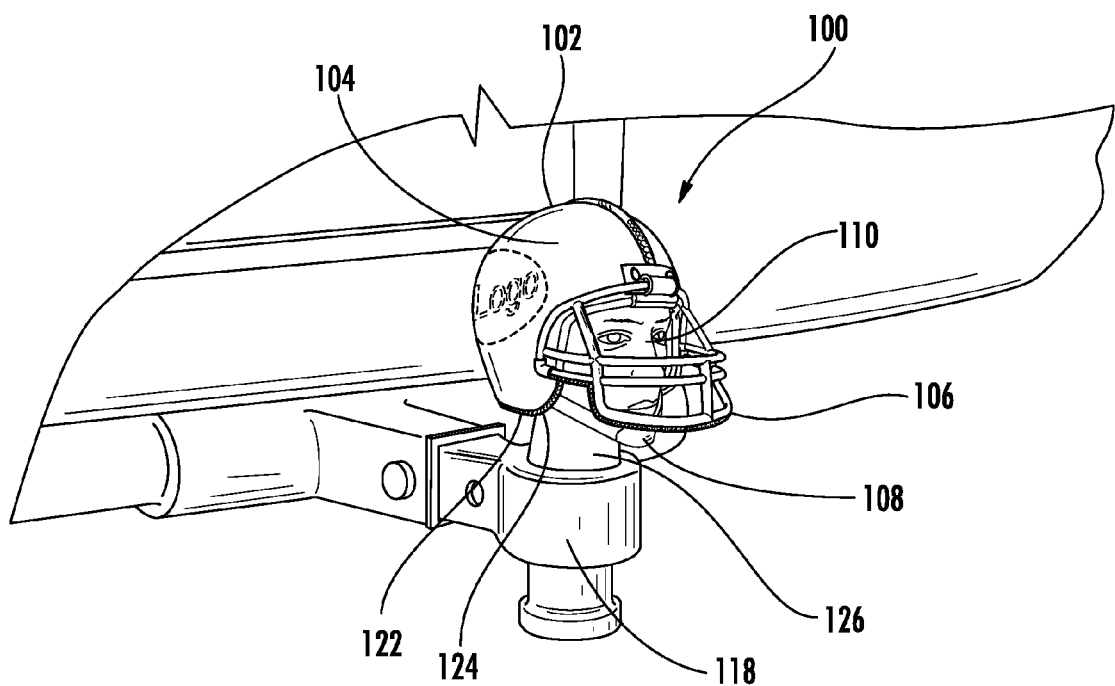
FIG. 1 is a perspective view of a trailer hitch ball cover according to one embodiment of the present invention, shown attached to a trailer hitch ball.
Figure 2:
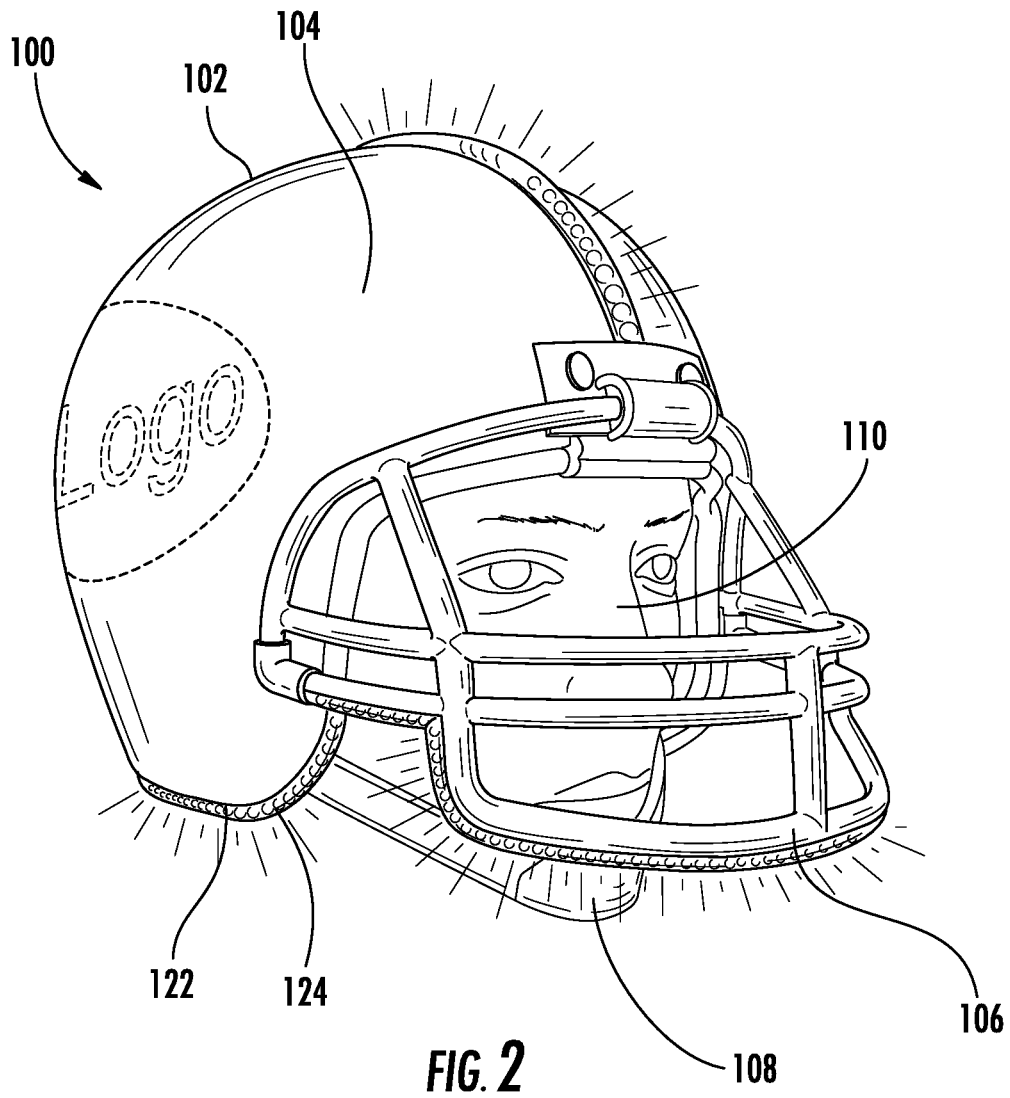
FIG. 2 is a perspective view of the trailer hitch ball cover of FIG. 1.
Figure 3:
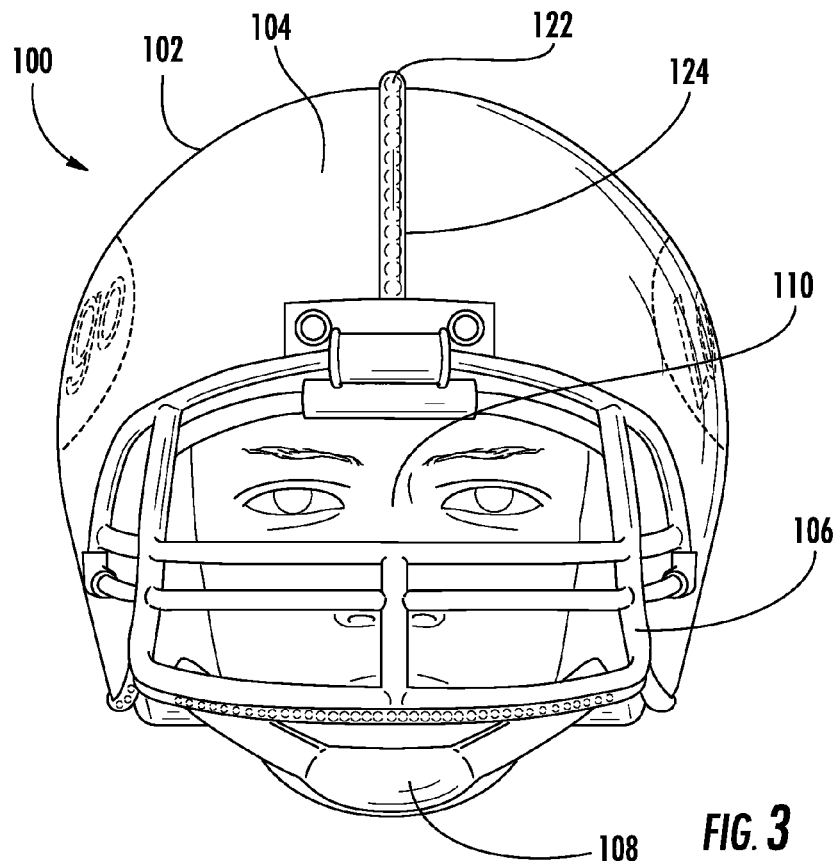
FIG. 3 is a front view of the trailer hitch ball cover of FIG. 1.
Figure 4:
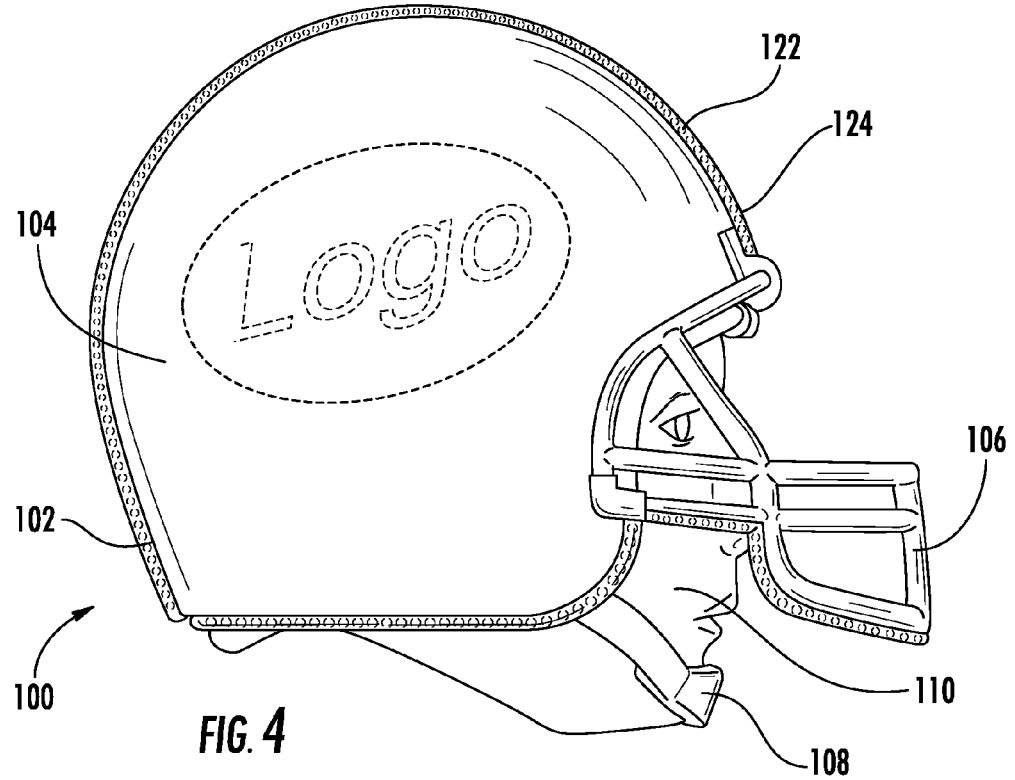
FIG. 4 is a side view of the trailer hitch ball cover of FIG. 1.
Figure 5:
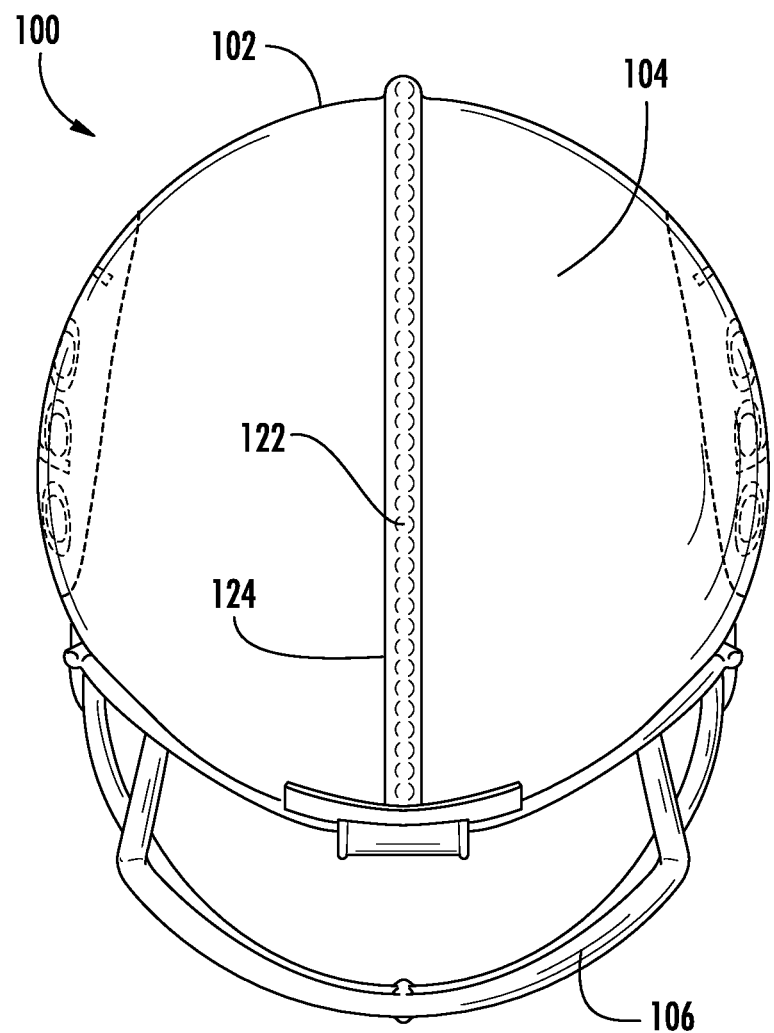
FIG. 5 is a top view of the trailer hitch ball cover of FIG. 1.

Embodiments of the invention provide trailer hitch ball covers for use with trailer hitch balls. While the trailer hitch ball covers are discussed for use with motor vehicles, they are by no means so limited. Rather, embodiments of the trailer hitch ball covers may be used in connection with any hitch balls capable of being covered or otherwise as desired.

FIGS. 1-10 illustrate embodiments of a trailer hitch ball cover 100. In these embodiments, the trailer hitch ball cover 100 comprises an outer shell 102, wherein the outer shell 102 is shaped to substantially conform to a three-dimensional shape of a type of headgear. For example, in the embodiments shown in FIGS. 1-10, the outer shell 102 is shaped to substantially conform to a three-dimensional shape of a football helmet 104. In other embodiments, the outer shell 102 may substantially conform to a three-dimensional shape of other types of headgear, such as other sport helmets (including, but not limited to, race-car helmets, hockey helmets, dirt-bike helmets, baseball helmets, and lacrosse helmets), service person helmets (including, but not limited to, firefighter helmets and police helmets), and military helmets (including, but not limited to, pilot helmets and infantry helmets). One of skill in the relevant art will understand that any suitable shape and configuration of the outer shell 102 may used in combination with the trailer hitch ball cover 100.

The outer shell 102, which is also depicted as the football helmet 104 in FIGS. 1-7, may be formed from a variety of materials, including, but not limited to, metal, fiberglass, plastic, wood, foam, and rubber, or a combination of such materials. In some embodiments, the outer shell 102 is required to be slightly flexible or malleable in some or all areas (to ensure coupling with a trailer hitch ball 116) and therefore may be formed from a material with such capability in those areas, if not throughout.

As described above, in the embodiments shown in FIGS. 1-7, the outer shell 102 comprises a football helmet 104. In some embodiments, the football helmet 104 may comprise a facemask 106 and a chin strap 108. In other embodiments, the football helmet 104 may also include a face 110 visible behind the facemask 106 and chin strap 108. In other embodiments, the overall form and shape of the trailer hitch ball cover 100 and outer shell 102, which may optionally include the face 110, may be configured to reference or imitate other sports teams, service units, military divisions, or other types of persons.

Figure 6:
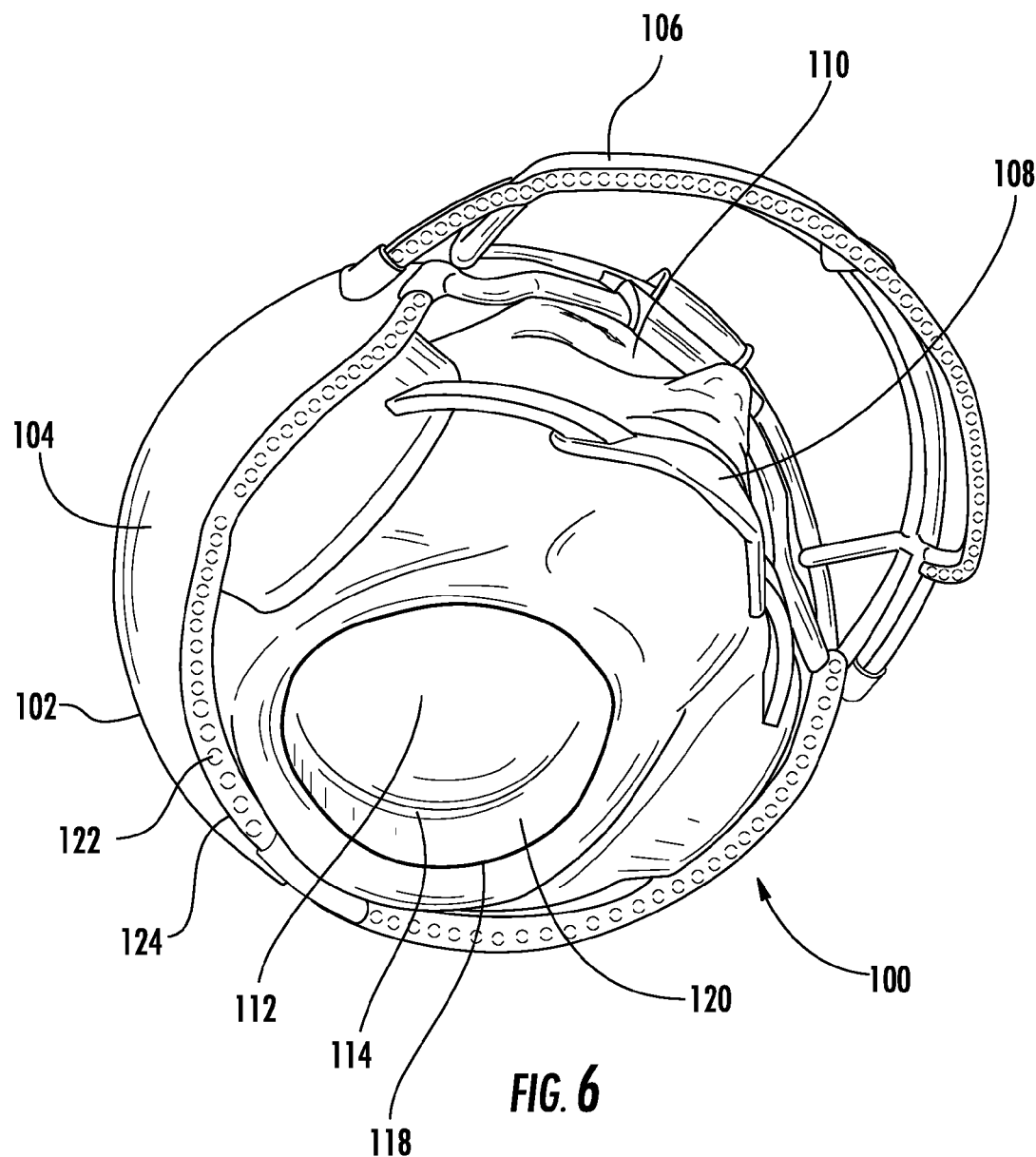
FIG. 6 is a bottom perspective view of the trailer hitch ball cover of FIG. 1, shown from the point of view of a trailer hitch ball.
Figure 7:
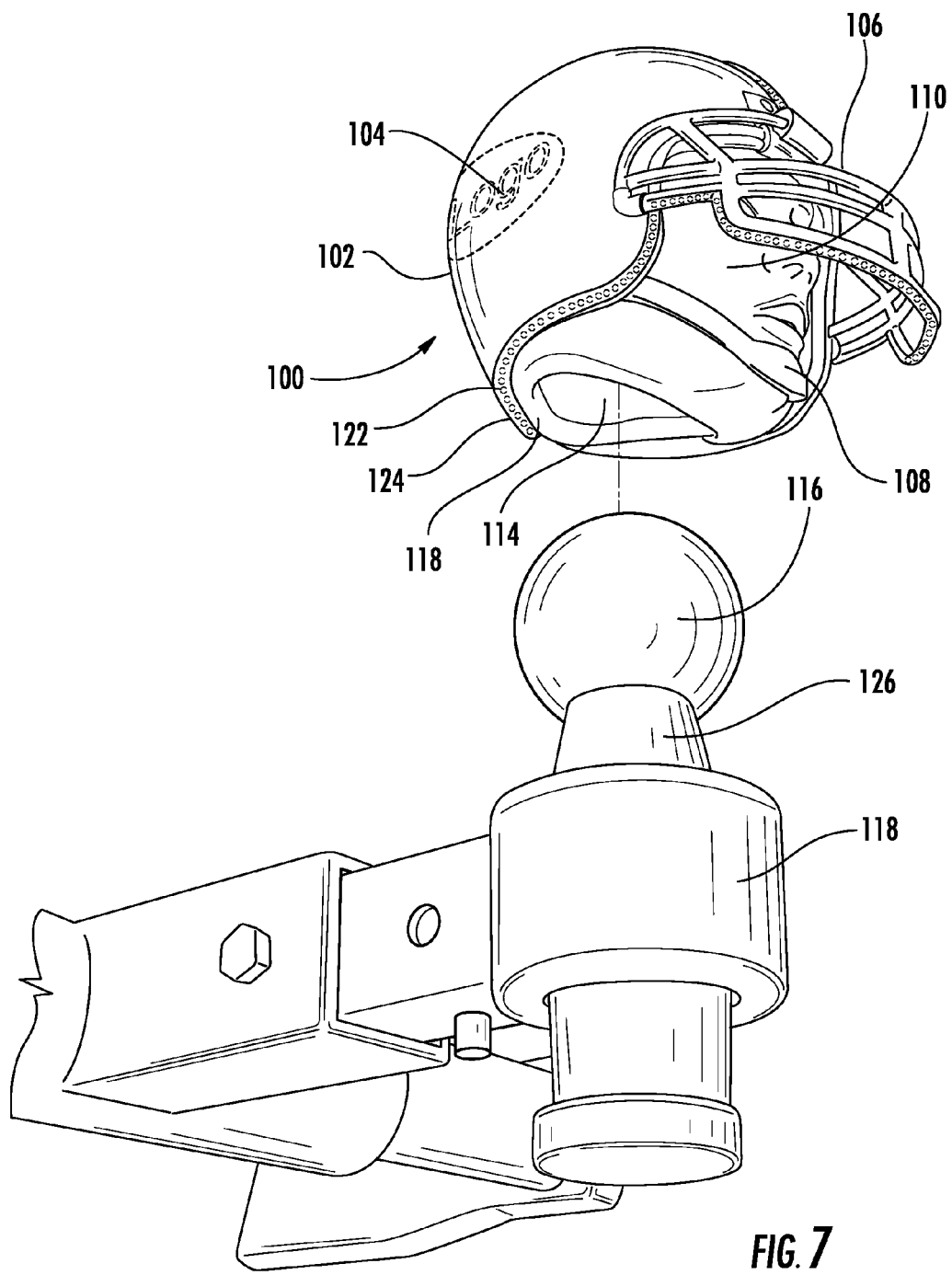
FIG. 7 is a perspective view of the trailer hitch ball cover of FIG. 1, shown in relation to a trailer hitch ball.

In some embodiments, inner components of the trailer hitch ball cover 100 include a three-dimensional inner socket 112 and three-dimensional channel 114 positioned adjacent a lower end of the inner socket 112, as illustrated in FIGS. 6-7. The inner socket 112 and the channel 114 may be formed of any suitable material including but not limited to plastic, foam, rubber, fiberglass, or a combination of such materials. Further, the inner socket 112 and the channel 114 may be formed of the same or different materials.

In some embodiments, the inner socket 112 comprises a recess positioned within a cushion 120, wherein the cushion 120 is positioned on an interior surface of the outer shell 102. The cushion 120 may be integrally formed with the outer shell 102, such as through injection molding or other similar processes. In other embodiments, the cushion 120 may be coupled or chemically adhered to the interior surface of the outer shell 102. In most embodiments, the material comprising the cushion 120 is solid, but at least slightly malleable and compressible, to properly host the insertion of the trailer hitch ball 116.

In these embodiments, such as the embodiments illustrated in FIGS. 1-10, the inner socket 112 may have any suitable size, depth, and shape that provides a secure coupling between the trailer hitch ball cover 100 and the trailer hitch ball 116. In some embodiments, the inner socket 112 has an overall shape that substantially conforms to the general three-dimensional shape of the trailer hitch ball 116. The amount of compressibility exhibited by the cushion 120 provides some flexibility for the inner socket 112 to couple to trailer hitch balls 116 having a range of three-dimensional shapes and diameters d.

In some embodiments, the channel 114 is positioned at a lower end of the inner socket 112, where the channel 114 has a cross-sectional diameter d', which is smaller than the diameter d of the trailer hitch ball 116 and is configured to substantially conform to a cross-sectional shape of a trailer hitch ball neck 126, which is positioned below the trailer hitch ball 116 and connects the trailer hitch ball 116 to a trailer hitch 118. In these embodiments, the channel 114 is formed of a compressible, flexible, malleable, or impressionable material, including but not limited to, plastic, foam, rubber, or a combination of such materials, which may be the same or different material from the cushion 120. In some embodiments, the channel 114 may even be integrally formed with the outer shell 102.

The compressibility of the channel 114 allows the trailer hitch ball 116 (having a diameter d) to pass through the channel 114 (having a cross-sectional diameter d'), wherein the channel 114 is configured to expand to a size approximating the diameter d of the trailer hitch ball 116 when receiving the trailer hitch ball 116, then contract to the un-expanded cross-sectional diameter d' below the trailer hitch ball 116 and adjacent the trailer hitch ball neck 126. The trailer hitch ball cover 100 is removed by pulling up on the trailer hitch ball cover 100 so that the trailer hitch ball 116 again passes through the channel 114, causing the channel 114 to expand to a cross-sectional shape approximating the diameter d of the trailer hitch ball 116 as the trailer hitch ball 116 passes through the channel 114, then contract to the un-expanded cross-sectional diameter d' once the trailer hitch ball 116 has exited the channel 114. The combination of the compressibility and contraction of the inner socket 112, cushion 120, and the channel 114 provide a coupling mechanism to secure the trailer hitch ball cover 100 to the trailer hitch ball 116 in these embodiments.

In other embodiments, the inner socket 112 may comprise a receptacle positioned within the cushion 120 to form the inner socket 112. The receptacle may be formed of a single piece of material or may comprise a plurality of pieces coupled to the cushion 120. The receptacle may be formed of any suitable material including but not limited to metal, plastic, foam, rubber, fiberglass, or a combination of such materials.

For example, in one embodiment, the receptacle has a shape resembling a spherical claw having a plurality of prongs, where the claw extends downward from the top of the inside of the outer shell 102 to form the inner socket 112. The claw has an overall shape that substantially conforms to the general three-dimensional shape of the trailer hitch ball 116. The amount of compressibility exhibited by the cushion 120 and the claw provide some flexibility for the plurality of prongs of the claw to expand to receive the trailer hitch ball 116. As a result, the inner socket 112 has the flexibility to couple to trailer hitch balls 116 having a range of three-dimensional shapes and diameters d. Once the trailer hitch ball 116 reaches the upper end of the claw, the plurality of prongs contract around the trailer hitch ball 116 so that lower ends of the prongs are positioned below the trailer hitch ball 116 to form the channel 114 at the lower end of the inner socket 112, where the channel 114 has the cross-sectional diameter d', which is smaller than the diameter d of the trailer hitch ball 116 and is configured to substantially conform to the cross-sectional shape of the trailer hitch ball neck 126. The expansion and contraction of the prongs in this embodiment provides for the secure coupling of the trailer hitch ball cover 100 to the trailer hitch ball 116.

Figure 8:
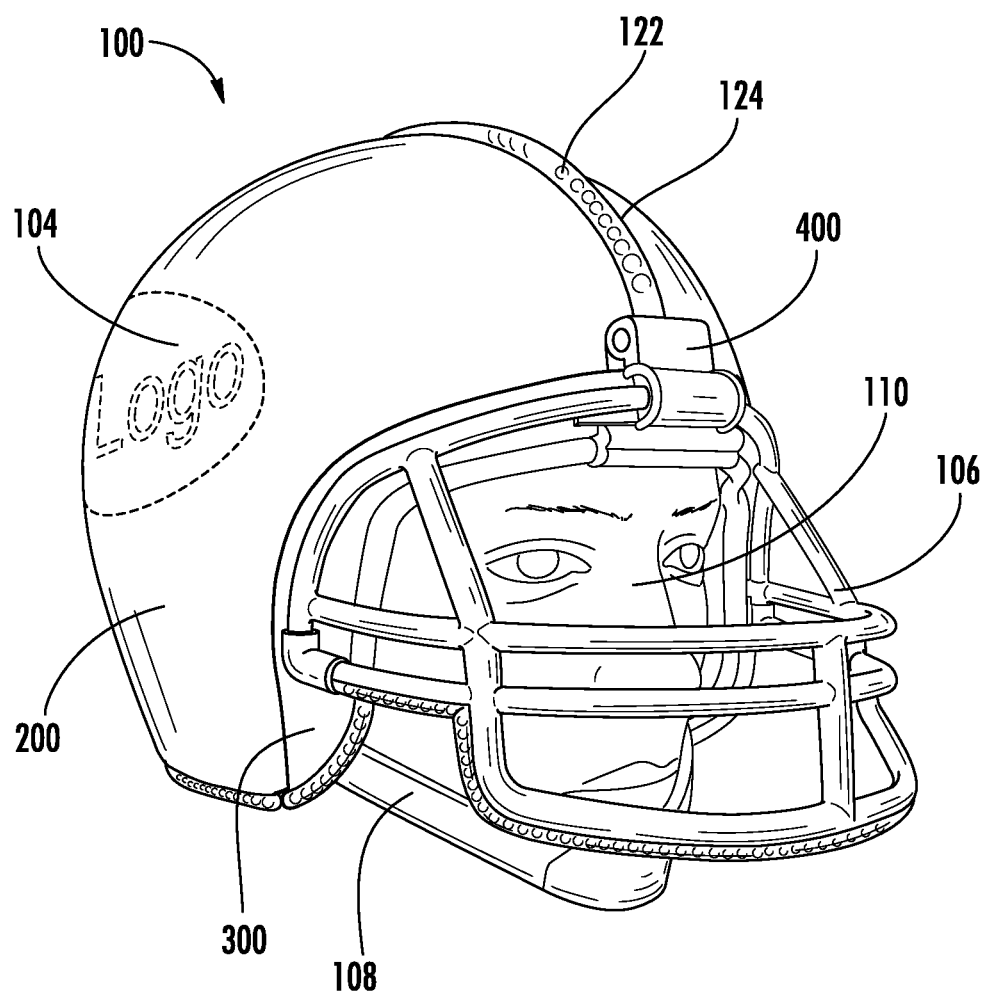
FIG. 8 is a perspective view of a trailer hitch ball cover according to an alternative embodiment of the present invention, shown in a closed position.
Figure 9:
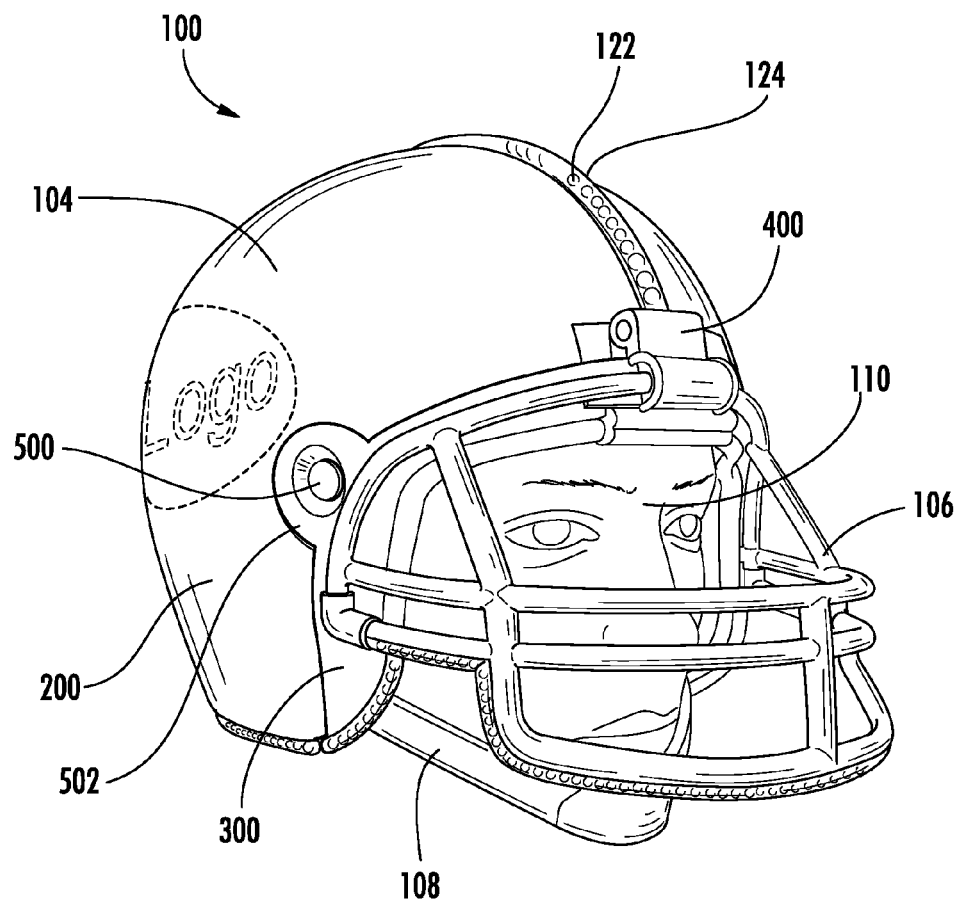
FIG. 9 is a perspective view of a trailer hitch ball cover according to another alternative embodiment of the present invention, shown in a closed position.
Figure 10:
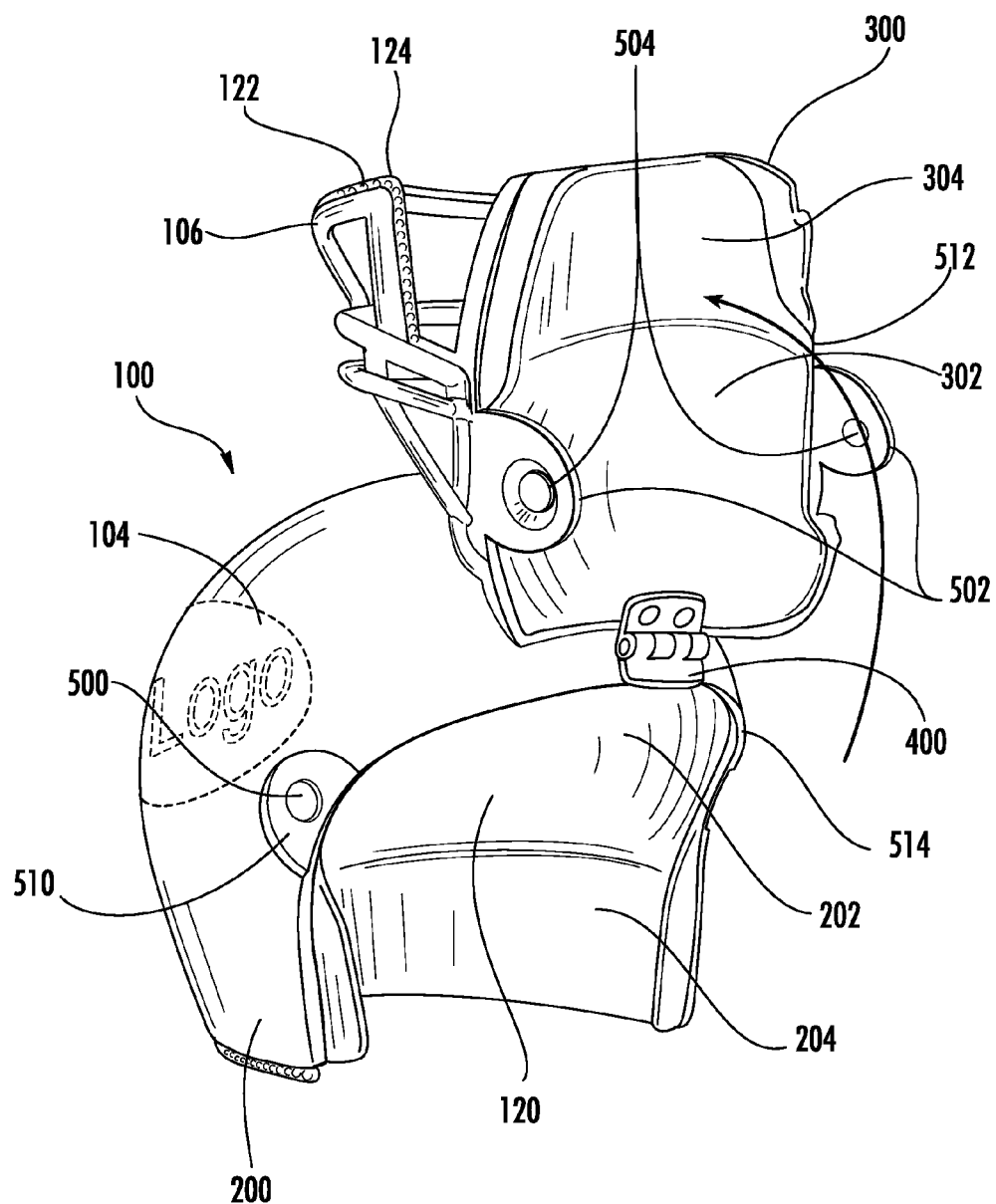
FIG. 10 is a perspective view of the trailer hitch ball cover of FIG. 9, shown in an open position.

In alternative embodiments, such as the embodiments illustrated in FIGS. 8-10, the trailer hitch ball cover 100 may comprise a first component 200 and a second component 300. In other embodiments, the outer shell 102 may comprise a plurality of components.

In the embodiments shown in FIGS. 8-10, the first component 200 comprises the majority of the outer shell 102, wherein the second component 300 comprises a front portion of the outer shell 102. In these embodiments, the separation between the first component 200 and the second component 300 approximately corresponds to the shape of the face mask 106 in the football helmet 104. One of skill in the relevant art, however, will understand that the trailer hitch ball cover 100 may be divided into multiple components along any suitable vertical, horizontal, or otherwise positioned cross-sectional line to separate the trailer hitch ball cover 100 into components that provide for ease of coupling the trailer hitch ball cover 100 to the trailer hitch ball 116.

In the embodiments shown in FIGS. 8-10, the first component 200 comprises substantially the bulk of the football helmet 104, and the second component 300 comprises the facemask 106, the chin strap 108, and the face 110. The inner socket 112 and the channel 114 are likewise divided between the components 200, 300 so that a first inner socket portion 202 and a first channel portion 204 is positioned on the first component 200 and a second inner socket portion 302 and a second channel portion 304 is positioned on the second component 300.

In some embodiments, the second component 300 is hingedly coupled to the first component 200 adjacent an upper pivot location via a hinge 400. In other embodiments, the two components 200, 300 may be fully separable or otherwise partially coupled to one another.

Various fastening means can be used throughout the embodiments to releasably couple the first component 200 and second component 300, placing the trailer hitch ball cover 100 into its closed position, including, but not limited to, traditional buttons (including when used in combination with chin strap 108 akin to real football helmets), spring buttons, pressure buttons, spring inserts, pressure inserts, and even hook and loop connectors. Additionally, throughout varying embodiments, there can be various points of fastening between the components 200, 300.

In the embodiment shown in FIG. 8, the second component 300 is releasably coupled to the first component 200 via pins or other devices that are positioned around an opening of the first component 200 and are received by receptacles positioned in adjacent locations around the perimeter of the second component 300.

In the embodiment shown in FIGS. 9-10, the second component 300 is snap-fit to the first component 200 via spring-loaded buttons 500 located adjacent the sides of the first component 200 within recesses 510 that are shaped to correspond to receive tabs 502 extending from the second component 300. Each tab 502 includes an aperture 504. When the second component 300 is positioned adjacent the first component 200 in a closed position, as shown in FIG. 9, each tab 502 extends over the adjacent button 500, which compresses the spring within the button 500 until the button 500 is positioned below the aperture 504 and the tab 502 is fully positioned within the recess 510. Once the button 500 is positioned below the aperture 504, the spring applies a force to extend the button 500 through the aperture 504 and releasably lock the second component 300 to the first component 200. Additional apertures 504 and buttons 500 may be used in various locations around the sides of the first component 200 and second component 300. The buttons 500 and apertures 504 may further include a lock for security measures.

In the various embodiments, depending on the fastening means, the components 200, 300 may have appropriate mating recesses 512 and extensions 514 to ensure a flush surface after connection, as illustrated in FIG. 10.

To couple the trailer hitch ball cover 100 shown in FIGS. 9-10 to the trailer hitch ball 116, the second component 300 is first released from the first component 200 by depressing the buttons 500 so that the buttons 500 do not extend through the apertures 504. The second component 300 is then rotated into an open position, as shown in FIG. 10. The trailer hitch ball cover 100 is then placed adjacent the trailer hitch ball 116 so that the first inner socket portion 202 is positioned adjacent the trailer hitch ball 116 and the first channel portion 204 is positioned adjacent the trailer hitch ball neck 126. The second component 300 is then rotated into the closed position so that the second inner socket portion 302 is positioned adjacent the trailer hitch ball 116 and the second channel portion 304 positioned adjacent the trailer hitch ball neck 126. The second component 300 is then snap-fit to the first component 200 to securely couple the trailer hitch ball cover 100 to the trailer hitch ball 116.

The ease of securing the trailer hitch ball 126 into the inner socket 112 in these embodiments allows for a wider range of materials to be used in the composition of the trailer hitch ball cover 100, the outer shell 102, inner socket 112, channel 114, and cushion 120 (if necessary). Namely, there is no need for the materials to be as flexible, malleable, or impressionable as with the integrally-formed embodiments shown in FIGS. 1-7. Materials with those capabilities may, however, still be used and may increase the options for and efficiency of the fastening means.

Additionally, embodiments may further include light sources 122, which serve to illuminate the trailer hitch ball cover 100 and surrounding areas of the vehicle. The light sources 122 may be attached throughout the trailer hitch ball cover 100, including both inside and out, in the form of a lighting assembly 124. The light sources 122 may be powered by various means, including, but not limited to, a vehicle's brake/signal trailer plug or an enclosed battery within the trailer hitch ball cover 100. Standard wiring may connect the light sources 122 to a power source. The outer shell 102 of the trailer hitch ball cover 100 may be penetrated in various embodiments when necessary to wire or secure the light sources 122.

The positioning of the light sources 122 may become increasingly important dependent on the desired utilization of the trailer hitch ball cover 100 by the user. For example, if the user desires to utilize the trailer hitch ball cover 100 as a means of personifying or displaying their affiliation with or feelings regarding a sports team, service, or military unit, or other design on the trailer hitch ball cover 100, the light sources 122 may be positioned to best utilize their light to enhance the visibility of the trailer hitch ball cover 100 and its design, form, and shape.

In one embodiment, the light sources 122 are solid state light sources such as light emitting diodes ("LEDs"). Other light sources, however, may be used. Moreover, the light sources 122 referenced herein can be single-die or multi-die light emitting diodes, DC or AC, or can be organic light emitting diodes ("O-LEDs"). Lighting assemblies 124 need not use only white light sources 122. Rather color or multi-color light sources 122 may be provided. Nor must all of the light sources 122 within a lighting assembly 124 be the same color.

In the embodiment illustrated in FIG. 1-7, the light sources 122 of the trailer hitch ball cover 100 are located as lighting assemblies 124 along an upper surface and a lower surface of the outer shell 102 (football helmet 104) and the lower surface of the facemask 106. This placement ensures that the design of the football helmet 104, the facemask 106, and the face 110 will be well illuminated at all times.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A trailer hitch ball cover comprising:
   (a) an outer shell comprising a football helmet, a facemask, a chin strap, and a face;
   (b) an inner socket positioned within the outer shell; and
   (c) a channel positioned adjacent a lower end of the inner socket;
   wherein the channel is configured to have an expandable cross-sectional shape that ranges from substantially conforming to a diameter of a trailer hitch ball neck to substantially conforming to a diameter of a trailer hitch ball; and
   wherein, light sources are coupled to an upper surface and a lower surface of the football helmet and a lower surface of the facemask.

2. The trailer hitch ball cover of claim 1, wherein the inner socket comprises a recess formed within a cushion positioned on an interior surface of the outer shell.

3. The trailer hitch ball cover of claim 2, wherein the inner socket comprises a receptacle coupled to the recess formed within the cushion.

4. A trailer hitch ball cover comprising:
 (a) an outer shell comprising a first component releasably coupled to a second component;
 (b) an inner socket formed within the outer shell when the first component is adjacent the second component, wherein the inner socket is configured to have a shape that substantially corresponds to a shape of a trailer hitch ball; and
 (c) a channel positioned adjacent a lower end of the inner socket when the first component is adjacent the second component, wherein the channel is configured to have a cross-sectional shape that substantially conforms to a diameter of a trailer hitch ball neck;
 wherein the second component is releasably coupled to the first component via spring loaded buttons.

5. The trailer hitch ball cover of claim 4, wherein the second component is also pivotally coupled to the first component.

6. The trailer hitch ball cover of claim 4, wherein the inner socket is formed within the outer shell via a first inner socket portion positioned on the first component that is positioned adjacent a second inner socket portion positioned on the second component.

7. The trailer hitch ball cover of claim 4, wherein the channel is formed adjacent the lower end of the inner socket via a first channel portion positioned on the first component that is positioned adjacent a second channel portion positioned on the second component.

8. The trailer hitch ball cover of claim 4, wherein the outer shell is shaped to resemble human headgear.

9. The trailer hitch ball cover of claim 4, further comprising light sources coupled to the outer shell and positioned to illuminate the trailer hitch ball cover.

10. A trailer hitch ball cover comprising:
 (a) an outer shell comprising a first component releasably coupled to a second component;
 (b) an inner socket formed within the outer shell when the first component is adjacent the second component, wherein the inner socket is configured to have a shape that substantially corresponds to a shape of a trailer hitch ball; and
 (c) a channel positioned adjacent a lower end of the inner socket when the first component is adjacent the second component, wherein the channel is configured to have a cross-sectional shape that substantially conforms to a diameter of a trailer hitch ball neck, wherein
 (i) the second component is pivotally coupled to the first component;
 (ii) the first component comprises a football helmet;
 (iii) the second component comprises a facemask, a chin strap, and a face; and
 (iv) light sources are coupled to an upper surface and a lower surface of the football helmet and a lower surface of the facemask.

\* \* \* \* \*